(12) United States Patent
Tabacchi

(10) Patent No.: US 6,910,247 B1
(45) Date of Patent: Jun. 28, 2005

(54) SPECTACLE FRAME WITH ARMS WHICH CAN BE OPENED OUT RESILIENTLY

(75) Inventor: Vittorio Tabacchi, Pieve di Cadore (IT)

(73) Assignee: Safilo Societa Azionaria Fabbrica Italiana Lavorazione Occhiali S.p.A., (IT)

( * ) Notice: Subject to any disclaimer, the term of this patent is extended or adjusted under 35 U.S.C. 154(b) by 0 days.

(21) Appl. No.: 10/398,144

(22) PCT Filed: Oct. 4, 2000

(86) PCT No.: PCT/IT00/00396

§ 371 (c)(1),
(2), (4) Date: Apr. 2, 2003

(87) PCT Pub. No.: WO02/29476

PCT Pub. Date: Apr. 11, 2002

(51) Int. Cl.[7] ............................................. G02C 5/22
(52) U.S. Cl. ...................................... 16/228; 351/113
(58) Field of Search .......................... 16/228; 351/140, 351/453, 113

(56) References Cited

U.S. PATENT DOCUMENTS

| 5,018,242 A | * | 5/1991 | Guy et al. | 16/228 |
| 5,165,060 A | * | 11/1992 | Huang | 351/113 |
| 5,406,339 A | * | 4/1995 | Chen | 351/153 |
| 5,473,395 A | * | 12/1995 | Huang | 351/113 |
| 6,027,215 A | * | 2/2000 | Hsu | 351/114 |
| 6,033,069 A | * | 3/2000 | Lee | 351/113 |
| 6,353,965 B1 | * | 3/2002 | Lo | 16/228 |
| 6,381,807 B1 | * | 5/2002 | Hsu | 16/228 |
| 6,631,194 B2 | * | 10/2003 | Fukuoka | 361/113 |

FOREIGN PATENT DOCUMENTS

| FR | 2 662 516 | 11/1991 |
| WO | WO 97/39377 | 10/1997 |
| WO | WO 98/43127 | 10/1998 |

\* cited by examiner

*Primary Examiner*—Suzanne Dino Barrett
*Assistant Examiner*—Mark Williams
(74) *Attorney, Agent, or Firm*—Altera Law Group, LLC

(57) ABSTRACT

A spectacle frame with arms which can be opened out resiliently comprises a shoulder (3), an arm (2) articulated to the shoulder by means of a tie rod (5) hinged thereon and guided for sliding on the arm (2), resilient means (13) acting between the arm (2) and the tie rod (5) in order to urge the arm towards the shoulder, and a stop element interposed between the resilient means and the arm. The stop element comprises a sleeve (11) guided for sliding on the tie rod (5) and fixed firmly to the arm (2) by means of a locking pin (15).

10 Claims, 3 Drawing Sheets

SPECTACLE FRAME WITH ARMS WHICH CAN BE OPENED OUT RESILIENTLY

A spectacle frame with arms which can be opened out resiliently

TECHNICAL FIELD

The subject of the present invention is a spectacle frame with arms which can be opened out resiliently, according to the preamble to the main claim.

BACKGROUND ART

This definition is intended to include frames having systems for the articulation of the arms, by virtue of which the arms can be pivoted beyond the normal open position although they are returned to this position resiliently when released.

Within this field, it is known to produce frames in which a tie rod is hinged an the shoulder and engaged for sliding in a sheath of the arm, and a spring acts between the tie rod and a stop element guided for sliding on the tie rod and fixed to the sheath. A spectacle frame having the features outlined above is also known from U.S. Pat. No. 5,406,339. A spectacle frame having the features outlined above is also known from U.S. Pat. No. 5,406,339.

However, to ensure a sufficiently firm connection, the stop element is fixed to the art by a screw element, thus imposing serious technical limitations on the production of the entire arm in plastics material and consequently detracting from the breadth of the potential production range of the frame.

Moreover, the above-mentioned screw element in of somewhat small dimensions, making the assembly of the components of the system for articulating the arm to the shoulder quite awkward.

The problem upon which the present invention is based is that of providing a spectacle frame which has arms that can be opened out resiliently and which is designed structurally and functionally to overcome the limitations explained above with reference to the prior art mentioned.

Within the scope of this problem, a further object of the invention is to provide a frame which has a limited number of components and a low production cost, and which is easy to assemble.

DISCLOSURE OF THE INVENTION

This problem is solved and this object is achieved by the present invention by means of a spectacle frame with arms which can be opened out resiliently, formed in accordance with the appended claims.

BRIEF DESCRIPTION OF THE DRAWINGS

The characteristics and the advantages of the invention will become clearer from the detailed description of a preferred embodiment thereof, described by way of non-limiting example with reference to the appended drawings, in which.

BEST MODE FOR CARRYING OUT THE INVENTION

Figure 1:
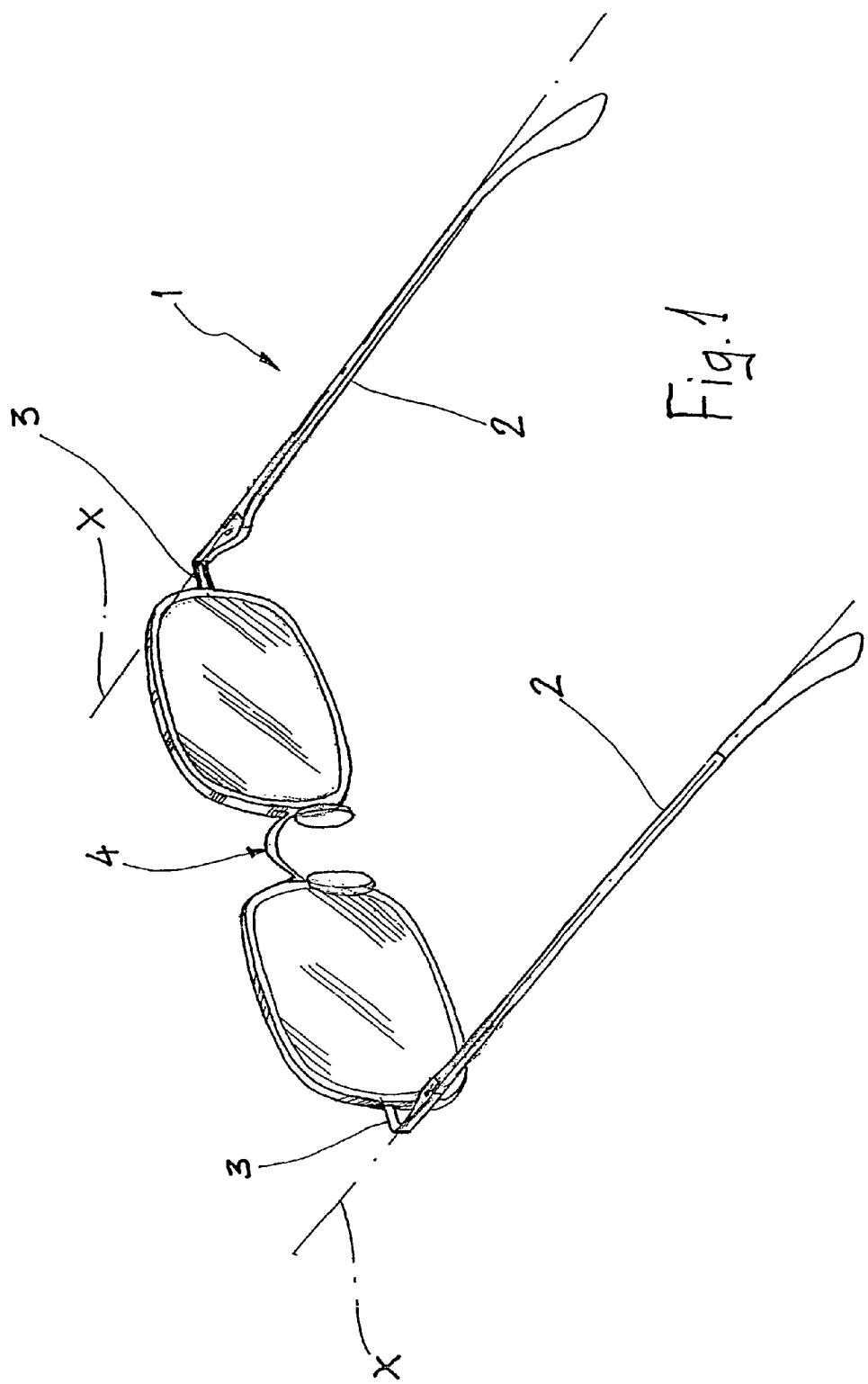
FIG. 1 is a perspective view of a spectacle frame formed in accordance with the present invention.
Figure 2:
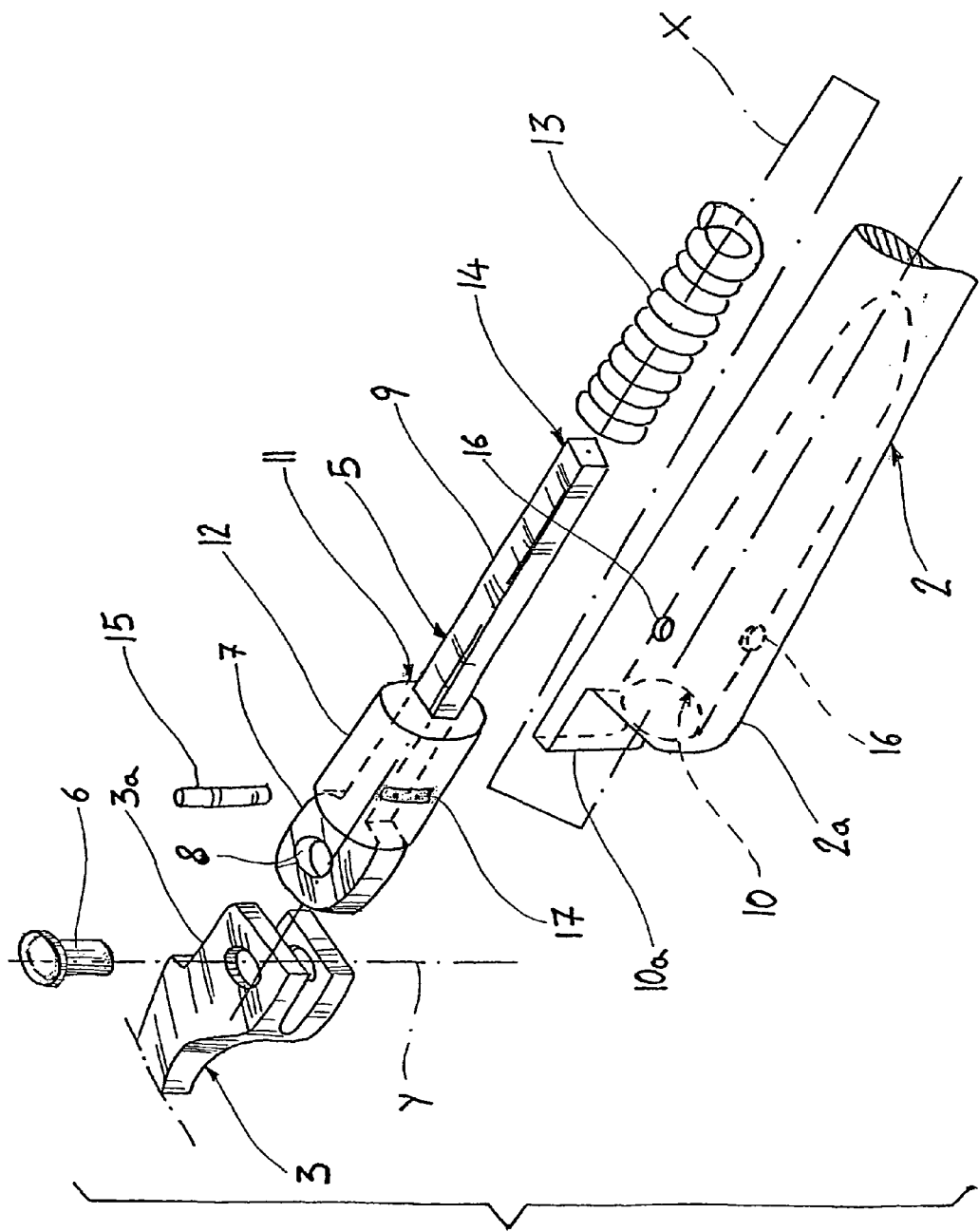
FIG. 2 is an exploded, partially sectioned, perspective view of a detail of the frame of FIG. 1.

With reference initially to FIGS. 1 and 2, a spectacle frame with arms which can be opened out resiliently, formed in accordance with the present invention, is generally indicated 1.

The frame 1 comprises arms 2 having longitudinal axes X, articulated to respective shoulders 3 of a front frame, generally indicated 4.

A tie-rod 5 is hinged on each shoulder 3 by means of a screw pin 6 having an axis Y substantially perpendicular to the axis X.

The tie rod 5 comprises a head 7 having a through-hole 8 for housing the pin 6 and a stem 9 extending axially from the head 7. The stem 9 is rod-shaped with a rectangular cross-section and is housed for sliding in a sheath 10 formed at an end 2a of the arm 2 closest to the shoulder 3.

The sheath 10 housing the stem 9 has a circular cross-section and extends longitudinally along the axis X.

An appendage 10a extends axially beside the sheath 10 from the end 2a of the arm 2 towards a corresponding abutment seat 3a of the shoulder 3 and serves to abut the latter when the arm 2 is pivoted beyond the normal opening position.

A sleeve 11 with a rectangular internal cross-section corresponding to that of the stem 9 is fitted for sliding on the stem 9 in order to abut the head 7 of the tie rod 5. The sleeve 11 comprises a cylindrical wall 12 with an outside diameter substantially corresponding to the inside diameter of the sheath 10.

Figure 3:
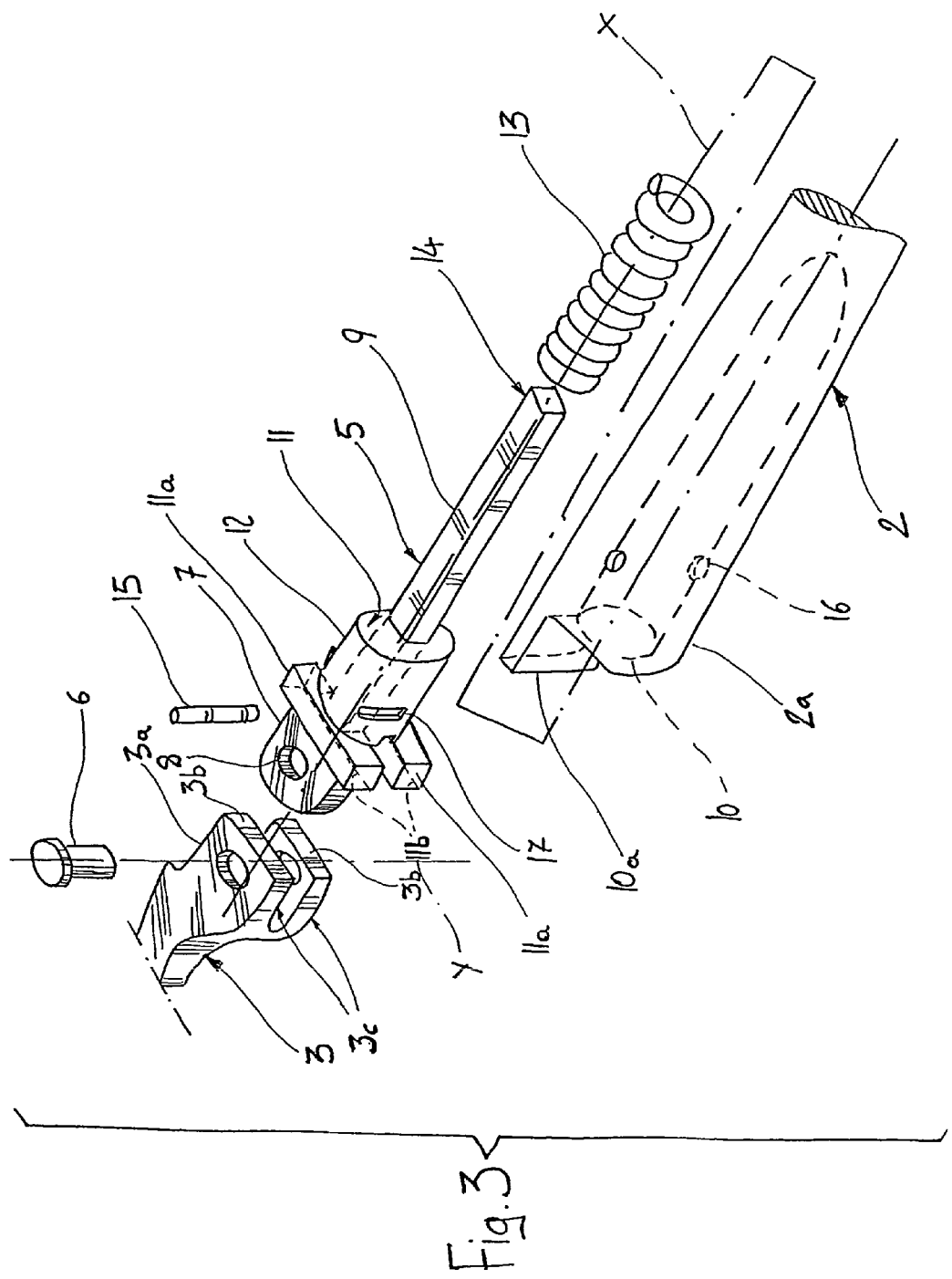
FIG. 3 is a view similar to FIG. 2 of a variant of the spectacles of FIG. 1.

According to a variant of the frame 1, shown in FIG. 3, the sleeve 11 may advantageously have feet 11a disposed on the side facing the head 7 and arranged symmetrically with respect to the head 7. The feet 11a extend predominantly in a direction substantially perpendicular to the axis X and have flat surfaces lib for abutting respective cam profiles 3b defined on the shoulder 3. The cam profiles 3b are formed on the edges of respective plate-like tabs 3c which extend from the shoulder 3 in order to house the head 7 of the tie rod 5 between them. The contact surface between the shoulder 3 and the sleeve 11 is thus advantageously increased.

A spring 13 is also fitted on the stem 9 and is in abutment, at one end, with the sleeve 11, which thus acts as a stop element for the spring 13 and, at the other end, with a portion 14 of the tie rod 5 defined at the free end of the stem 9. The portion 14 is deformed by squashing during the assembly of the frame 1 as soon as the spring 13 has been fitted on the stem 9. The spring 13 thus acts between the tie rod 5 and the sleeve 11.

According to the invention, the sleeve 11 is fixed firmly to the sheath 10 by means of a locking pin 15 extending transversely relative to the axis X between two opposed holes 16 formed in the sheath 10. The pin 15 is partially housed in a notch 17 formed tangentially in the cylindrical wall 12 of the sleeve 11.

It will be noted that, owing to the provision of a rectangular cross-section of the stem 9 and of the sleeve 11, the shaped coupling between these two components constitutes means for preventing rotation of the arm 2, which is fixed firmly to the sleeve 11 by means of the locking pin 15, relative to the tie rod 5, which in turn is restrained on the shoulder.

In the frame according to the invention, the arm 2, including the sheath 10, is made entirely of plastics material.

During the assembly of the frame 1, the sleeve 11 and the spring 13 are fitted on the stem 9 in succession and the end portion 14 of the stem is then deformed by squashing so as to abut the spring 13 at the opposite end to the sleeve 11. The stem 9 of the tie rod is then inserted in the sheath 10 so that the notch 17 of the sleeve 11 is in alignment with the holes 16. The sleeve 11 is then locked relative to the arm 2 by the insertion of the pin 15 through the holes 16 so as to engage the notch 17 of the cylindrical wall 12. The head 7 of the tie rod 5 is articulated to the shoulder 3 by means of the pin 6.

When the arm 2 is pivoted beyond the normal open position (shown in FIG. 1), as a result of the abutment of the appendage 10a with the abutment seat 3a (and of the consequent displacement of the axis of pivoting of the arm 2), the stem 9 of the tie rod 5 is guided for sliding out of the sheath 10. The sleeve 11, firmly fixed to the arm 2, is thus moved towards the portion 14 of the tie rod 5, compressing the spring 13.

When the arm 2 is released, the sleeve 11 is urged towards the head 7 by the spring 13, thus moving the arm 2 towards the shoulder 3 and returning it to the normal open position.

The present invention thus solves the problem complained of above with reference to the prior art mentioned, at the same time offering many other advantages, amongst which is facilitated assembly of the components of the frame and the fact that all of the externally visible components such as the arm and the sheath can be made of plastics material.

What is claimed is:

1. A spectacle frame with arms which can be opened out resiliently, comprising a shoulder (3), an arm (2) articulated to the shoulder by means of a tie rod (5) hinged on the shoulder (3) and guided for sliding on the arm (2), resilient means (13) acting between the arm (2) and the tie rod (5) in order to urge the arm (2) towards the shoulder, a stop element interposed between the resilient means (13) and the arm (2), and locking means for fixing the stop element firmly to the arm, the stop element comprising a sleeve (11) guided for sliding on the tie rod (5) and fixed firmly to the arm (2) by means of a locking pin (15), characterized in that the sleeve (11) is guided for sliding on the tie rod (5) with a shaped coupling between the sleeve and tie rod which prevents rotation of the sleeve relative to the tie rod regardless of the position of the arm.

2. A frame according to claim 1 in which the coupling which prevents rotation is defined by a polygonal coupling.

3. A frame according to claim 1 in which the sleeve (11) is housed in a sheath (10) of the arm (2) so as to constitute, with the sheath, coupling means between the tie rod (5) and the arm (2).

4. A frame according to claim 1 in which the sleeve (11) has an outer cylindrical wall (12) and the locking pin comprises a pin (15) extending transversely relative to the arm (2) and intersecting the outer cylindrical wall (12).

5. A frame according to claim 4 in which a tangential notch (17) is formed in the cylindrical wall (12) of the sleeve (11) and constitutes a seat for partially housing the pin (15).

6. A frame according to claim 1 in which the tie rod (5) comprises a head (7) arranged to be hinged on the shoulder (3) and a stem (9) extending from the head (7), the sleeve (11) being fitted on the stem (9) between the head (7) and the resilient means (13).

7. A frame according to claim 1 in which, at the end remote from the sleeve (11) the resilient means (13) are in abutment with a region (14) of the tie rod (5) which is deformed by squashing.

8. A frame according to claim 1 in which the arm (2) and the sheath (10) are made of plastics material.

9. A spectacle frame with arms which can be opened out resiliently, comprising:
   a shoulder (3);
   an arm (2) articulated to the shoulder by means of a tie rod (5) hinged on the shoulder (3) and guided for sliding on the arm (2);
   resilient means (13) acting between the arm (2) and the tie rod (5) in order to urge the arm (2) towards the shoulder;
   a stop element interposed between the resilient means (13) and the arm (2); and
   locking means for fixing the stop element firmly to the arm, the stop element comprising a sleeve (11) guided for sliding on the tie rod (5) and fixed firmly to the arm (2) by means of a locking pin (15), characterized in that the sleeve (11) is guided for sliding on the tie rod (5) with a shaped coupling between the sleeve and tie rod which prevents rotation of the sleeve relative to the tie rod, wherein
   the sleeve (11) has feet (11a) and is in abutment with the shoulder (3) by means of surfaces (11b) of the feet which can abut respective cam profiles (3b) of the shoulder (3).

10. A frame according to claim 9 in which the feet (11a) extend symmetrically with respect to the head (7) and the cam profiles (3b) are defined on the edges of respective tabs (3c) extending from the shoulder, the tabs (3c) being able to house the head (7) when it is hinged on the shoulder (3).

* * * * *